United States Patent
Ransil et al.

(10) Patent No.: US 6,382,385 B2
(45) Date of Patent: May 7, 2002

(54) ROLLER CONVEYING APPARATUS

(75) Inventors: Matthew J. Ransil, Lancaster; Thomas G. Donkin, Sinking Spring, both of PA (US)

(73) Assignee: Morgan Corporation, Morgantown, PA (US)

( * ) Notice: Subject to any disclaimer, the term of this patent is extended or adjusted under 35 U.S.C. 154(b) by 0 days.

(21) Appl. No.: 09/794,458

(22) Filed: Feb. 27, 2001

Related U.S. Application Data

(60) Provisional application No. 60/185,533, filed on Feb. 28, 2000.

(51) Int. Cl.⁷ .............................................. B65G 13/00
(52) U.S. Cl. ................................ 193/35 SS; 193/35 R; 198/782
(58) Field of Search ........................ 193/35 SS, 35 R; 198/782

(56) References Cited

U.S. PATENT DOCUMENTS

| | | | | |
|---|---|---|---|---|
| 4,036,345 A | * | 7/1977 | Webb | 193/35 SS |
| 4,089,399 A | * | 5/1978 | Webb | 193/35 SS |
| 4,498,384 A | * | 2/1985 | Murphy | 100/224 |
| 4,549,844 A | * | 10/1985 | Miller | 414/534 |
| 4,593,810 A | * | 6/1986 | Cook | 198/781 |
| 4,750,604 A | * | 6/1988 | Cook | 198/468.6 |
| 4,819,554 A | * | 4/1989 | Fleischer et al. | 100/224 |
| 4,909,372 A | * | 3/1990 | Jones | 193/35 SS |
| 4,909,378 A | * | 3/1990 | Webb | 198/721 |
| 5,123,517 A | * | 6/1992 | Windau | 198/463.3 |
| 5,372,247 A | | 12/1994 | Nishikawa | |
| 5,947,676 A | * | 9/1999 | Richard | 414/535 |

FOREIGN PATENT DOCUMENTS

| | | |
|---|---|---|
| EP | 0 359 870 A1 | 3/1990 |
| EP | 0 304 527 B1 | 1/1992 |
| WO | WO 99/40002 | 8/1999 |

* cited by examiner

Primary Examiner—Christopher P. Ellis
Assistant Examiner—Rashmi Sharma
(74) Attorney, Agent, or Firm—Carella Byrne Bain Gilfillan Cecchi; Elliot M. Olstein; William Squire

(57) ABSTRACT

A track assembly comprises an inner channel member and an outer channel member, the outer channel member having opposing flanges with a conduit for receiving an air line for operating the assembly. An inflatable air bag is between the inner and outer channel members for raising and lowering the air bag. Rollers attached to the inner channel member are raised and lowered as the air bag raises and lowers the inner channel member. The air line, which is flexible and compressible, for operating the air bag, is releasably attached externally the channel members in and protected by the conduit by opposing spaced ribs. The air line is squeezed between the ribs during insertion into the conduit.

8 Claims, 2 Drawing Sheets

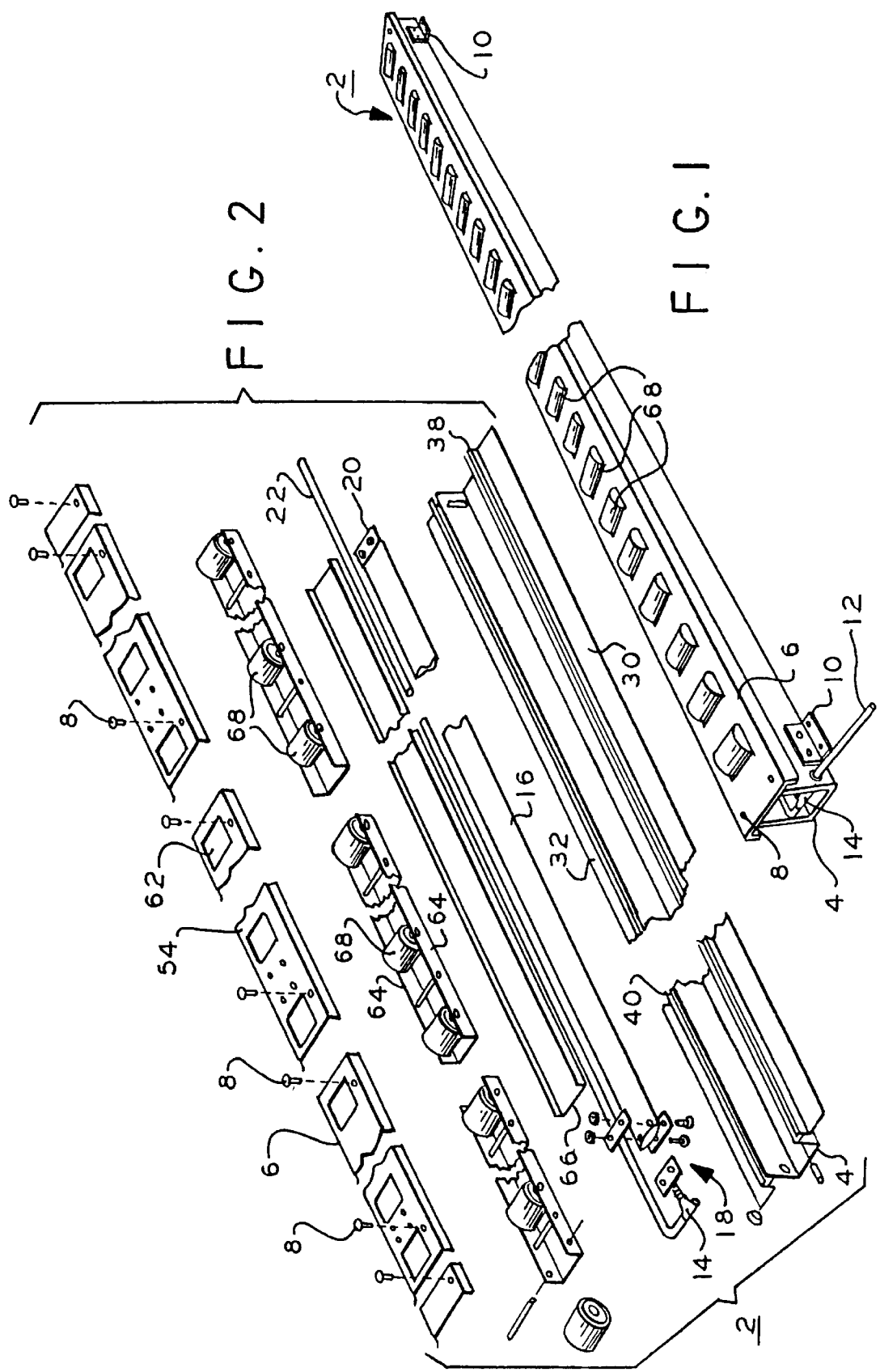

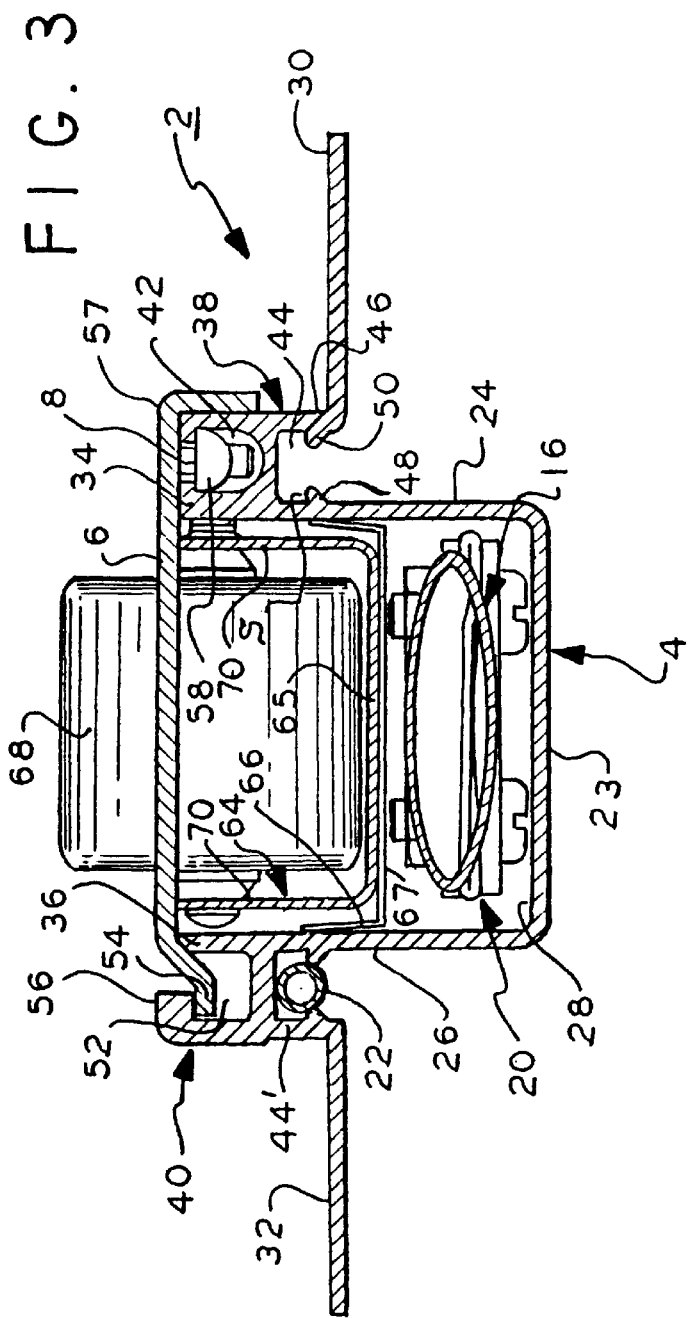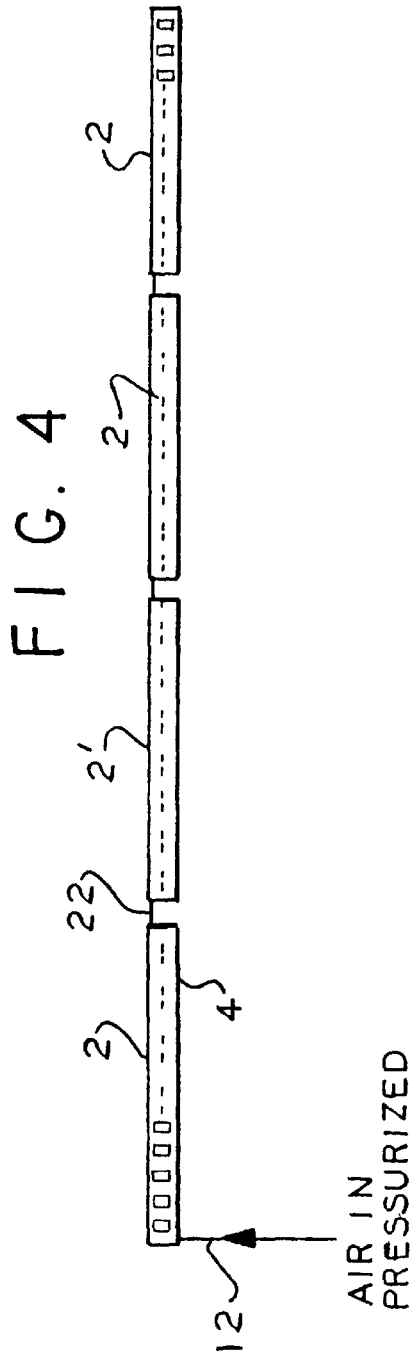

ROLLER CONVEYING APPARATUS

This application claims priority from provisional application Ser. No. 60/185,533, filed Feb. 28, 2000.

This invention relates to roller track conveying apparatus for conveying cargo loads.

Of interest are U.S. Pat. Nos. 4,909,378, 4,750,604, 4,909,372, 4,036,345 and 4,089,399 all incorporated by reference herein.

These patents relate to roller track mechanical handling systems in which an outer elongated channel member receives an elongated inflatable air bag along the channel member length. The air bag is supplied with pressurized air to selectively inflate or deflate the bag. A second inner elongated channel member is nested within the outer channel member. A series array of rollers are rotatably secured to the inner channel member and are aligned with openings in a top plate secured over the outer channel member. The inner channel member rests on the air bag and is raised and lowered within the outer channel member as the air bag is inflated and deflated. This raises the rollers to an exposed operative position extending above the top plate to receive cargo to be displaced. When the bag is deflated, the rollers are recessed into the outer channel member below the top plate permitting the cargo to rest on the top plate of the assembly and become relatively difficult to displace and stationary due to high frictional resistance with the plate. A pressurized air line is coupled to the end track air bag to selectively pressurize and deflate the air bags.

Typically, a series of such tracks are installed end to end to form a continuous linear track. A fitting is connected to the end air bag to receive a pressurized inlet air line from a pressurized air source and also to supply pressurized air to a further air line which feeds pressurized air to the immediate longitudinally serially aligned next adjacent track via fittings coupled to each air bag. In similar fashion, a further air line feeds air to the next successive one of the series of aligned tracks.. The problem with this arrangement is that the various air lines, which are plastic hoses, are placed externally the outer channel member where the air lines tend to become damaged. For example, installation of floor screws and drilling holes in the floor during installation of a track may damage the air lines. Also, the present inventors note that the lines may abrade during use and attribute this abrasion to vibrations of the lines during transit of the vehicle carrying the track(s).

The present invention is a recognition of a solution to this problem.

A roller track conveying apparatus according to the present invention comprises an elongated outer channel member defining an outer channel and including a first bottom wall; an elongated inner channel member disposed in the outer channel and defining an inner channel, the inner channel member including a second bottom wall; a plurality of rollers rotatably secured to said inner channel member in said inner channel; a top plate secured to the outer channel member for enclosing the outer and inner channels and having a plurality of spaced openings, each opening for receiving a corresponding roller; an inflatable bag disposed between the first and second bottom walls for selectively displacing the inner channel member to cause the rollers to selectively protrude through the corresponding openings in the top plate; and an elongated third channel member secured to and along the length of the outer channel member having an air line channel for receiving, protecting and securing a pressurized air line extending along said length, the air line being adapted to selectively inflate the air bag.

In one aspect, the outer channel member includes a pair of spaced first upright side walls, said third channel member being secured to at least one of said first side walls externally said outer channel.

In another aspect, the outer channel member includes a flange extending in opposing directions outwardly from each of the outer channel side walls, the third channel member being located adjacent to at least one of said flanges.

In a further aspect, the third channel member includes a portion secured to at least one of said flanges and a portion secured to the outer channel member.

Preferably the third channel member has a portion secured to each flange on each outer side of the outer channel member and a portion secured to each of opposing outer sides of the outer channel member, said portions, flange and outer channel member cooperating to form the third channel member on each said outer sides of the outer channel member.

In a further aspect, each flange has a top wall securing channel arranged for securing the top wall to the outer channel member, the third channel member including a third channel member bottom wall forming a bottom wall of the top wall securing channel, a pair of spaced ribs extending along the outer channel member secured to the outer channel member for forming an air line receiving mouth to the air line channel of the third channel member, the ribs for releasably securing the received air line in said air line channel.

In a still further aspect, each flange has a depending outer side wall, a first rib extending inwardly toward the outer channel member from said depending outer side wall and overlying a first portion of the third channel member channel and a second rib extending outwardly toward the first rib from an outer channel member side wall and overlying a second portion of the third channel member channel, the ribs forming a mouth for receiving the air line there through into the third channel member channel and for retaining the air line in the third channel member channel.

in a still further aspect, the air bag is elongated and arranged to receive pressurized air at one end thereof from said air line, the third channel member having a mouth along the length thereof and arranged to releasably receive the air line in translation through the mouth into the third channel member channel.

Thus, according to an aspect of the present invention, the outer channel member, which has a bottom channel member wall, two upright spaced walls and two corresponding flanges which extend radially outwardly from the outer and inner channel members, has an air line conduit in each flange for selectively receiving and securing a pressurized inlet air line external the outer channel member and protected from damaging action of the inner channel member during displacement of the inner channel member and inflation and deflation of the air bag. The conduits are on each outer side of the outer channel member in the flange for selective reception of a corresponding air line adjacent to that particular conduit.

IN THE DRAWING

FIG. 1 is a perspective view of a roller track assembly according to the present invention;

FIG. 2 is an exploded view of the assembly of FIG. 1;

FIG. 3 is a cross sectional end elevation view of the track of FIG. 1; and

FIG. 4 is a plan view of a series of similar tracks as shown in FIG. 1 aligned in a linear array as used in a typical commercial application.

In FIGS. 1–3, track assembly 2 comprises a stamped metal outer channel member 4 and a stamped metal cover or top plate 6 screwed to channel member 4 with screws 8. Angle iron brackets 10 secure the channel member 4 to a floor of a cargo receiving area. In FIG. 4, a linear array of track assemblies 2 are coupled adjacent to each other to form a linear track for the mechanical transfer of cargo along a cargo receiving area. A pressurized air inlet hose 12 is coupled to a fitting 14 at the channel member 4 end of the end most track assembly of the series of tracks. The hose 12, which may be thermoplastic tubing, receives pressurized air from a source not shown. The fitting 14 is connected to the end of an elongated inflatable air bag 16, FIG. 2, by a clamp assembly 18. The air bag is relatively flat in the deflated condition of FIG. 2 and is ballooned when inflated (not shown). See the aforementioned patents incorporated by reference for more detail on such an air bag and track assembly in general. A clamp 20, FIG. 2, seals the end of the air bag opposite the clamp assembly 18. A further air hose 22 is connected to the fitting 14 for connection to a further inlet fitting 14 (not shown in the figures) of the next adjacent track assembly 2' of the array of track assemblies, FIG. 4. In this way each successive air bag is coupled to the pressurized inlet hose 12 in series.

The outer channel member 4, FIG. 3, has a bottom wall 23 and two opposing side walls 24 and 26. These walls form a channel receptacle 28 for the air bag 16, the fitting 14, clamp assembly 18 and clamp 20 (FIG. 2). Identical mirror image flanges 30 and 32 extend outwardly from a respective conduit member 38 and 40 attached to the respective corresponding side wall 24 and 26 adjacent to the upper respective edge regions 34 and 36 of the side walls. Flange 30 extends from conduit member 38 and flange 32 extends from conduit member 40.

The conduit members 38 and 40 extend for the full length of the channel member 4, the flanges, conduit members and walls 23, 24 and 26 being integral one piece metal extrusions, e.g., aluminum. Conduit member 38 has an axially extending conduit 42 and forms a top element of side wall 24. An open channel 44 is beneath the conduit 42 and faces in a direction toward the bottom of the side wall 24 and bottom wall 22. Flange 30 extends from the bottom edge of the outer side wall 46 of the channel 44. The channel 44 is partially enclosed adjacent to the flange 30 by two opposing ribs 48 and 50 extending inwardly toward each other from the respective side walls 24 and 46. These ribs are generally triangular shaped and have a surface S normal to walls 24 and 46 from which they extend. The normal surfaces are located in the interior of the channel 44. The ribs have a second surface opposite the surface S that extends from the walls 24 and 46 inclined to these walls forming a triangular cross section rib shape. The ribs are spaced apart to form an opening therebetween that is smaller than the diameter of the air hose such as hose 22. An air hose such as hose 22 is placed in the channel 44 by temporarily compressing and deforming the hose to fit in the space between the ribs 48 and 50 during insertion into the channel 44. The edges of the ribs are rounded to preclude damage to the hose 22 during insertion. The hose 22 is inserted for the length of the channel to the extent of the length of the hose and is releasably captured in the channel 44 by ribs 48 and 50. This retains the hose for the length of the hose externally of the channel member 4 receptacle 28. This precludes vibration abrasion of the hose 22 because the hose is securely restrained from vibration for its length. The ribs 48 and 50 retain the hose for its length and preclude such vibration. In addition, since the hose is substantially encased in the conduit member 40 channel 44 or 44', it is out of harms way and protected from potential damaging screw installation and drilling accompanying track installation.

Conduit member 40 has an identical channel 44' which receives the hose 22 in this embodiment. The hose 22 could in the alternative be placed in channel 44. Conduit member 40 also has an upper channel 52. A top plate 6 has a lip 54 that is captured by overlying conduit member 40 lip 56. Plate 6 is screwed at its opposite edge 57 to conduit member 38 channel 42 by a nut 58 and mating screw 8 (FIG. 2). The top plate 6 has a plurality of rectangular openings 62, FIG. 2.

An inner metal stamped channel member 64 has a bottom wall 65 that rests on the bottom wall 67 of a thermoplastic (e.g., Acetal) wiping channel member 66. The side walls of the member 66 slide along the inner surfaces of the outer channel member side walls 24 and 26 in up and down reciprocal motion of the inner channel member 64 and seal the receptacle 28 containing the air bag 16. These up and down motions are in response to inflation and deflation of the air bag 16. In FIG. 3 the air bag 16 is shown spaced from the member 66 bottom wall 67 for clarity of illustration, these elements normally abutting. The inner metal channel member 64 has side walls 70.

Rotatably attached to the side walls 70 of the inner channel member 64 by bearings is a cargo support roller 68. The roller 68 moves up and down with the channel member 64 as the air bag 16 inflates and deflates. The rollers 68, FIG. 2, pass through the openings 62 in the top plate 6. This is described in more detail in the aforementioned patents. Except for the channels 44 and 44' and ribs 48 and 50, the remaining structures are prior art elements described in the aforementioned patents and need not be described in more detail herein.

In operation, when the air bags are inflated all of the rollers of all of the series aligned tracks are raised above the top plate 6 for conveying cargo loads thereon. When the bags are deflated the rollers become recessed and the cargo rests stationary on the plates 6. All air lines associated with each track extend along the length of that track externally of the receptacle 28 and are protected from damage during operation of the air bags.

What is claimed is:

1. A roller track conveying apparatus comprising:

an elongated outer channel member defining an outer channel and including a first bottom wall;

an elongated inner channel member disposed in the outer channel and defining an inner channel, the inner channel member including a second bottom wall;

a plurality of rollers rotatably secured to said inner channel member in said inner channel;

a top plate secured to the outer channel member for enclosing the outer and inner channels and having a plurality of spaced openings, each opening for receiving a corresponding roller;

an inflatable bag disposed between the first and second bottom walls for selectively displacing the inner channel member to cause the rollers to selectively protrude through the corresponding openings in the top plate; and an elongated third channel member secured to and along the length of the outer channel member having an air line channel for receiving, protecting and securing a pressurized air line extending along said length, the air line being adapted to selectively inflate the air bag.

2. The apparatus of claim 1 wherein the outer channel member includes a pair of spaced first upright side walls, said third channel member being secured to at least one of said first side walls externally said outer channel.

3. The apparatus of claim 2 wherein the outer channel member includes a flange extending in opposing directions outwardly from each of the outer channel side walls, the third channel member being located adjacent to at least one of said flanges.

4. The apparatus of claim 3 wherein the third channel member includes a portion secured to at least one of said flanges and a portion secured to the outer channel member.

5. The apparatus of claim 3 wherein the third channel member has a portion secured to each flange on each outer side of the outer channel member and a portion secured to each of opposing outer sides of the outer channel member, said portions, flange and outer channel member cooperating to form the third channel member on each said outer sides of the outer channel member.

6. The apparatus of claim 3 wherein each flange has a top wall securing channel arranged for securing the top wall to the outer channel member, the third channel member including a third channel member bottom wall forming a bottom wall of the top wall securing channel, a pair of spaced ribs extending along the outer channel member secured to the outer channel member for forming an air line receiving mouth to the air line channel of the third channel member, the ribs for releasably securing the received air line in said air line channel.

7. The apparatus of claim 3 wherein each flange has a depending outer side wall, a first rib extending inwardly toward the outer channel member from said depending outer side wall and overlying a first portion of the third channel member channel and a second rib extending outwardly toward the first rib from an outer channel member side wall and overlying a second portion of the third channel member channel, the ribs forming a mouth for receiving the air line there through into the third channel member channel and for retaining the air line in the third channel member channel.

8. The apparatus of claim 1 wherein the air bag is elongated and arranged to receive pressurized air at one end thereof from said air line, the third channel member having a mouth along the length thereof and arranged to releasably receive the air line in translation through the mouth into the third channel member channel.

* * * * *